(12) United States Patent
Jain et al.

(10) Patent No.: US 11,146,634 B2
(45) Date of Patent: Oct. 12, 2021

(54) STORAGE POOL ISOLATION (71) Applicant: International Business Machines Corporation, Armonk, NY (US)

(72) Inventors: Abhishek Jain, Uttar Pradesh (IN); Sarvesh S. Patel, Pune (IN); Sachin C. Punadikar, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 16/394,469

(22) Filed: Apr. 25, 2019

(65) Prior Publication Data

US 2020/0344296 A1    Oct. 29, 2020

(51) Int. Cl.
*H04L 29/08* (2006.01)
*H04L 12/46* (2006.01)
*G06F 9/455* (2018.01)
*H04L 12/931* (2013.01)

(52) U.S. Cl.
CPC ...... *H04L 67/1097* (2013.01); *G06F 9/45558* (2013.01); *H04L 12/4641* (2013.01); *G06F 2009/45595* (2013.01); *H04L 49/356* (2013.01)

(58) Field of Classification Search
None
See application file for complete search history.

(56) References Cited

U.S. PATENT DOCUMENTS

| | | | |
|---|---|---|---|
| 9,363,176 B2* | 6/2016 | DeCusatis | H04L 45/74 |
| 10,009,443 B1 | 6/2018 | Guigli | |
| 10,776,317 B1* | 9/2020 | Veeraswamy | G06F 3/0604 |
| 2014/0092907 A1* | 4/2014 | Sridhar | H04L 12/66 |
| | | | 370/392 |
| 2015/0081893 A1* | 3/2015 | Chadwell | G06F 3/0659 |
| | | | 709/224 |
| 2015/0229724 A1* | 8/2015 | Ray | H04L 45/026 |
| | | | 370/352 |
| 2015/0295800 A1* | 10/2015 | Bala | H04L 67/2809 |
| | | | 709/224 |
| 2016/0036703 A1* | 2/2016 | Josyula | H04L 45/66 |
| | | | 370/392 |
| 2017/0366476 A1* | 12/2017 | Sweeney | H04L 47/24 |
| 2018/0077114 A1 | 3/2018 | Rong et al. | |
| 2018/0109401 A1* | 4/2018 | Miyazaki | H04L 12/4633 |
| 2018/0139073 A1* | 5/2018 | Han | H04L 12/4625 |
| 2018/0176181 A1 | 6/2018 | Fu et al. | |
| 2020/0036610 A1* | 1/2020 | Indiresan | H04L 43/045 |
| 2020/0112515 A1* | 4/2020 | Brar | G06F 9/45558 |
| 2020/0249970 A1* | 8/2020 | Sahin | G06F 3/0664 |

* cited by examiner

*Primary Examiner* — Dhairya A Patel
(74) *Attorney, Agent, or Firm* — Scully, Scott, Murphy & Presser, P.C.

(57) ABSTRACT

A method, computer program product, and a computer system are disclosed for isolating data to one or more storage pools receive a packet from a host; determine whether the packet contains virtual extensible local area network (VXLAN) information; extract, in response to determining that the packet contains VXLAN information, a network identifier from the packet; determine one or more storage pools that correspond to the extracted network identifier; and store data from the packet in the one or more determined storage pools.

20 Claims, 4 Drawing Sheets

STORAGE POOL ISOLATION

BACKGROUND

The disclosure herein relates generally to server and storage virtualization, and more particularly, to methods, apparatus, and products enabling awareness of identifiers in storage virtualization appliances and storing data within one or more storage pools based on the identifiers.

Server virtualization allows one or more Virtual Machines (VMs) to be created on a physical device, in which each VM is assigned a unique media access control (MAC) address. A server virtualization infrastructure may often be used to support multiple tenants. Each tenant may share the same software application and single physical database; however, each tenant may require network separation to support administrative, security policy, and application requirements. By sharing the single physical database, a mechanism, such as an Ethernet frame, is required to ensure unique MAC addresses and virtual local area network identifiers (VLAN IDs) among the tenants. The traditional Ethernet frame provides a 12-bit field for identifying a VLAN ID, which may be supported with up to 4095 unique identifiers. However, the limit of the unique VLAN IDs may be easily reached when a large number of VMs in a single Ethernet network are segregated via VLANs.

To address the size deficiencies of the traditional Ethernet frame, a virtual extensible local area network (VXLAN) may be used to encapsulate MAC traffic from individual VMs and send the encapsulated traffic over a logical tunnel. With VXLAN support, the creation of large numbers of virtual domains above existing networks may be possible. This enables users to efficiently use their current infrastructure while leveraging the benefits of VXLAN to support the requirements of multiple tenants and large-scale deployment of applications and VMs.

During server virtualization, VMs can communicate with other VMs connected on the same VXLAN, thereby creating an isolated network environment in which data from one connected group of VMs can be separated from another group of VMs connected on a different VXLAN. However, when a VM makes a request to a storage hypervisor to store data, the storage controller of the device is unaware of the presence of VXLAN and distributes the data among the attached physical storage pools without classifying the data based on the VM's network, i.e., the VXLAN. Therefore, for the cases in which there are multiple VXLANs and the data is being stored to a physical storage pool, the data, which was once isolated to a particular VXLAN during server virtualization, is now stored in a common pool of storage and is no longer isolated from data utilized on a different VXLAN.

SUMMARY

The summary of the disclosure is given to aid understanding of a computer system, server virtualization, storage virtualization, and method of enabling awareness of identifiers in storage virtualization appliances and storing data within one or more storage pools based on the identifiers, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

According to one or more embodiments of the present disclosure, a method of isolating data to one or more storage pools is disclosed. In one or more embodiments, the method includes receiving a packet from a host. In one or more embodiments, the method includes determining whether the packet contains virtual extensible local area network (VXLAN) information. In one or more embodiments, the method includes extracting, in response to determining that the packet contains VXLAN information, a network identifier from the packet. In one or more embodiments, the method includes determining one or more storage pools that correspond to the extracted network identifier. In one or more embodiments, the method includes storing data from the packet in the one or more determined storage pools.

According to one or more embodiments, a computer program product for isolating data to one or more storage pools is disclosed. In one or more embodiments, a computer program product includes a non-transitory computer-readable storage medium having program instructions embodied therewith, in which the program instructions are executable by one or more processors. In one or more embodiments, the program instructions include receiving a packet from a host. In one or more embodiments, the program instructions includes determining whether the packet contains virtual extensible local area network (VXLAN) information. In one or more embodiments, the program instructions includes extracting, in response to determining that the packet contains VXLAN information, a network identifier from the packet. In one or more embodiments, the program instructions includes determining one or more storage pools that correspond to the extracted network identifier. In one or more embodiments, the program instructions includes storing data from the packet in the one or more determined storage pools.

According to one or more embodiments, an apparatus for isolating data to one or more storage pools is disclosed. In one or more embodiments, the apparatus includes memory having program instructions embodied therewith, and at least one processor. In one or more embodiments, the at least one processor is configured to read the program instructions to execute a target configured to receive a packet from a host. In one or more embodiments, the at least one processor is configured to read the program instructions to execute a target configured to determine whether the packet contains virtual extensible local area network (VXLAN) information. In one or more embodiments, the at least one processor is configured to read the program instructions to execute a target configured to extract, in response to determining that the packet contains VXLAN information, a network identifier from the packet. In one or more embodiments, the at least one processor is configured to read the program instructions to execute a target configured to determine one or more storage pools that correspond to the extracted network identifier. In one or more embodiments, the at least one processor is configured to read the program instructions to execute a target configured to store data from the packet in the one or more determined storage pools.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, server virtualization, storage virtualization, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, embodiments, or devices shown, and the arrangements, structures, subassemblies, features, aspects, methods, processes, embodiments, and devices shown may be used singularly or in combination with other arrangements, structures, assemblies, subassemblies, systems, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the computer system, server virtualization, storage virtualization, and their method of operation, however, it will be understood by those skilled in the art that different and numerous embodiments of the computer system, server virtualization, storage virtualization, and their method of operation may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information processing systems, including processors, virtual machines, one or more different types of hypervisors, storage pools, microprocessor systems, and architectures, which are apparent to those skilled in the art. It is assumed that those skilled in the art are familiar with the general virtualization processes, and in particular server virtualization and storage virtualization. It may be noted that a numbered element is numbered according to the figure in which the element is introduced, and is typically referred to by that number throughout succeeding figures.

Exemplary methods, apparatus, and products for server and storage virtualization, and in particular, for enabling awareness of identifiers in storage virtualization appliances and storing data within one or more storage pools based on the identifiers in accordance with the present disclosure are described further below with reference to the Figures.

Figure 1:
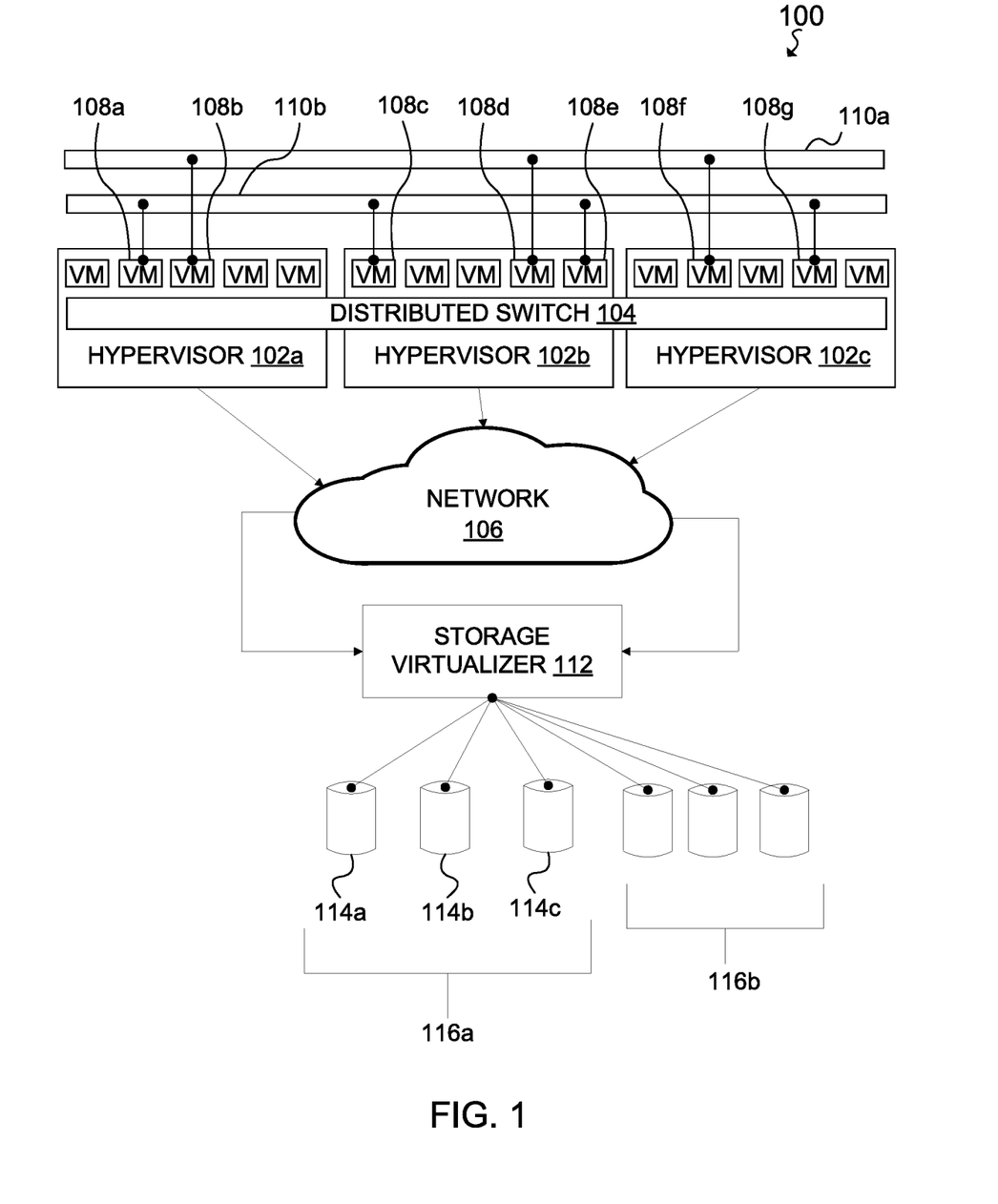
FIG. 1 is a functional block diagram illustrating a data processing environment, according to one or more embodiments of the present disclosure.

FIG. 1 is a functional block diagram illustrating a data processing environment 100, in accordance with one or more embodiments of the present disclosure. FIG. 1 provides only an illustration of one implementation and does not imply any limitations with regard to the environments in which different embodiments may be implemented. Many modifications to the depicted environment may be made by those skilled in the art without departing from the scope of the embodiments herein.

Data processing environment 100 includes one or more hypervisors, such as hypervisor 102a, hypervisor 102b, hypervisor 102c, connected via a distributed switch 104. Each hypervisor may host and operate one or more virtual machines (VMs), such as VM 108a, VM 108b, VM 108c, VM 108d, VM 108e, VM 108f, and VM 108g. Each VM may include a virtual network interface controller (vNIC) and a unique IP address. A VM may use the vNIC to communicate to another VM in the network of VMs, via the distributed switch 104. In one or more cases, the distributed switch 104 supports communications between VMs on the same host and/or other physical hosts. The distributed switch 104 may span across the physical nodes in the cluster. A VXLAN may be a tag used to isolate the communications between VMs. A VM may be configured to run an operating system and one or more applications. To create an isolated network environment, one or more VMs on a hypervisor may be connected to one or more other VMs on another hypervisor, via a VXLAN, and one or more other VMs may be connected to one or more other VMs, via a separate VXLAN. For example, VM 108a of hypervisor 102a, VMs 108c and 108e of hypervisor 102b, and VM 108g of hypervisor 102c are connected to and/or communicate over VXLAN 110b; and, VM 108b of hypervisor 102a, VM 108c of hypervisor 102b, and VM 108f of hypervisor 102c are connected to and/or communicate over VXLAN 110a.

Data processing environment 100 may include a storage virtualizer 112 connected to hypervisor 102a, 102b, and 102c, via a network 106. The network 106 interconnects the storage virtualizer 112 to the one or more hypervisors 102a, 102b, and 102c. In general, network 106 can be any combination of connections and protocols capable of supporting communication between the one or more hypervisors 102a, 102b, and 102c and the storage virtualizer 112. In one or more aspects, network 106 is a VXLAN transport network that enables logical switching from the one or more hypervisors to the storage virtualizer 112. In one or more other aspects, network 106 can be, for example, a local area network (LAN), a telecommunications network, a wide area network (WAN), such as the Internet, a virtual local area network (VLAN), or any combination that can include wired, wireless, or fiber optic connections. Network 106 can also include wire cables, wireless communication links, fiber optic cables, routers, switches and/or firewalls.

The storage virtualizer 112 is a storage virtualization appliance configured to present a single logical view of diverse physical storage from multiple network storage devices. The storage virtualizer 112 may be a block storage virtualization appliance that logically sits between one or more hosts, such as hypervisors 102a, 102b, and 102c, and one or more targets, such as storage array 116a and storage array 116b. A storage array may include one or more storage pools, such as, storage pool 114a, storage pool 114b, and storage pool 114c. In one or more cases, a storage pool can be categorized based on security levels. For example, storage pool 114a may have a higher security level than storage pools 114b and 114c. In one or more other cases, a storage pool can be categorized based on Redundant Array of Independent Disk (RAID) levels, compression methods, and/or other categorization features. A VXLAN can be assigned to one or more storage pools based on a tag or property of the storage pool. In one or more cases, a VXLAN can be manually assigned to a storage pool. Storage arrays may be a data storage system used for block-based storage, file-based storage, or object storage. The one or more storage arrays may be from the same vendor or from multiple vendors. The storage virtualizer 112 may present itself to the hosts as the storage provider and may present itself to the storage arrays as a host. The storage virtualizer 112 can move data from one storage array to another while maintaining uninterrupted I/O access to the hosts. In one or more aspects, the storage virtualizer 112 can be a storage area network (SAN) Volume Controller (SVC), such as an IBM SVC or a Spectrum Virtualize. The SVC may be physically attached to one or more SAN fabrics and can move data from one storage array to another while maintaining uninterrupted I/O access to the hosts. A SAN fabric may be hardware that connects servers to storage devices. The SAN fabric may enable server to storage device connectivity.

Figure 2:
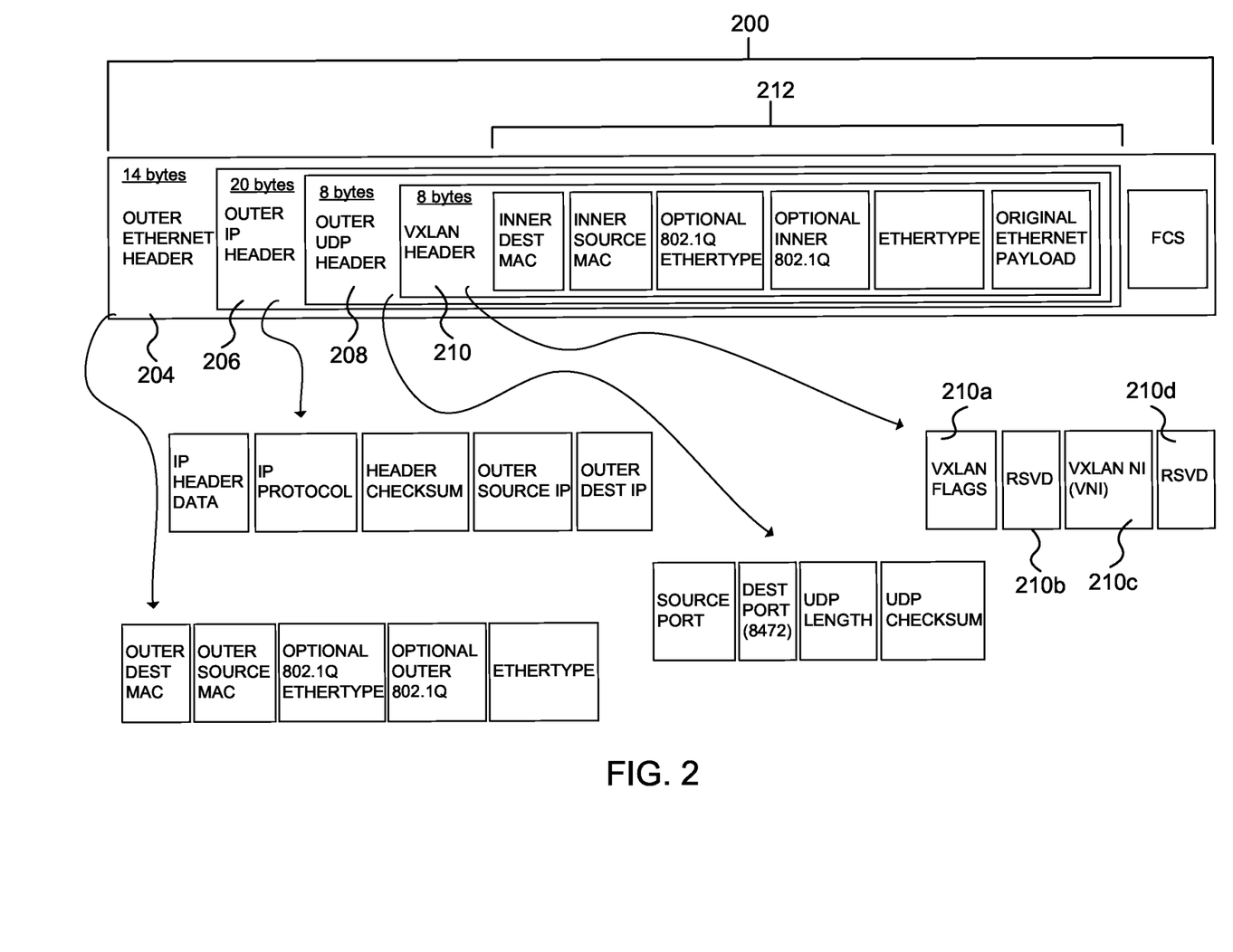
FIG. 2 illustrates an example of a VXLAN encapsulated packet, according to one or more embodiments of the present disclosure.

FIG. 2 illustrates an example of a VXLAN encapsulated packet 200, according to one or more embodiments of the present disclosure. The VXLAN encapsulated packet 200 includes an outer Ethernet header 204, an outer Internet Protocol (IP) header 206, an outer user Datagram Protocol (UDP) header 208, a VXLAN header 210, and an inner Ethernet packet 212. The VXLAN encapsulated packet 200 uses a MAC Address-in-user Datagram Protocol (MAC-in-UDP) encapsulation, in which an original Layer 2 frame includes the VXLAN header 210 within the outer IP header 206 and the outer UDP header 208.

The VXLAN header 210 may be an 8-byte VXLAN header. One or more bits of the VXLAN header 210 may include reserved bits, such as reserved bits 210b and 210d, bits related to VXLAN flags 210a, and bits related to VXLAN Network Identifier ("VNI") 210c. The VNI 210c may be a 24-bit VNI, and is used to identify Layer 2 segments and to maintain Layer 2 isolation between segments. For example, the VNI 210c may identify whether the VXLAN encapsulated packet 200 is transmitted over VXLAN 110a or VXLAN 110b. A VNI may be a number, e.g., VNI may be 101, identifying a VXLAN.

Figure 3:
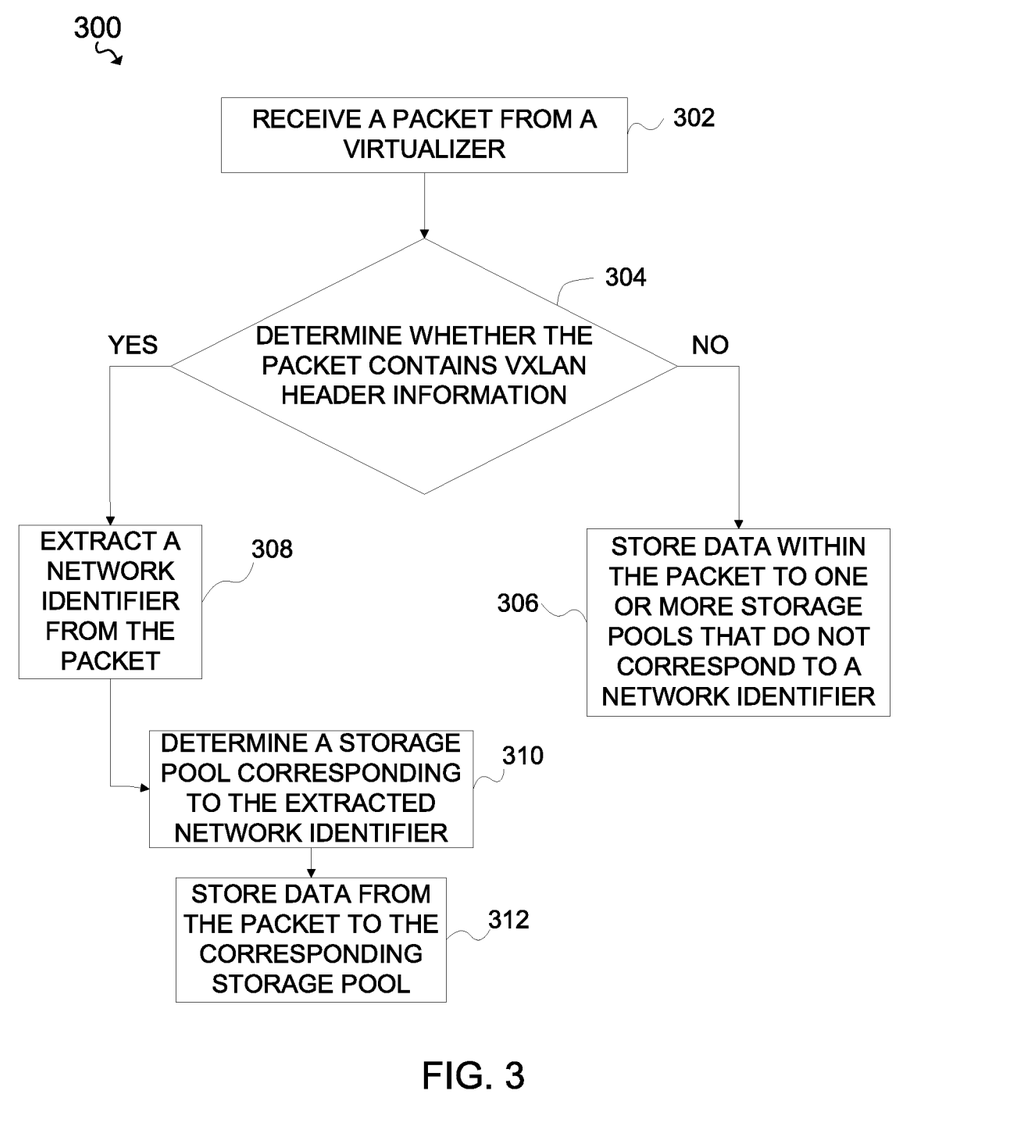
FIG. 3 is a flowchart illustrating a method of identifying a storage pool to store data, according to one or more embodiments of the present disclosure.

FIG. 3 is a flowchart illustrating a method 300 of identifying a storage pool to store data, according to one or more embodiments of the present disclosure. While the method 300 is described for the sake of convenience and not with an intent of limiting the disclosure as comprising a series and/or a number of steps, it is to be understood that the process does not need to be performed as a series of steps as shown in FIG. 3, but multiple steps can be abstracted into one functional unit that performs both the steps.

In one or more embodiments, a packet is received at 302, preferably by the storage virtualizer 112. A VM of a hypervisor, such as VM 108a of hypervisor 102a, may send the packet to the storage virtualizer 112. The VM may send the packet using the vNIC and or the NIC of the hypervisor. The packet may be an Ethernet packet, which may or may not include header information, such VXLAN header information. It should be noted that the terms Ethernet packet and Ethernet frame may be used interchangeably. In one or more embodiments, a determination is made, preferably by the storage virtualizer 112, at 304 as to whether the packet contains VXLAN header information. For example, the storage virtualizer 112 may determine whether the Ethernet packet contains VXLAN header information by decapsulating the Ethernet packet and reading the VNI from the VXLAN header information.

For the cases in which the packet contains VXLAN header information (304:YES), a network identifier is extracted from the packet at 308, preferably by the storage virtualizer 112. For example, the storage virtualizer 112 may extract a VNI from the Ethernet packet and determine that the extracted VNI corresponds to VXLAN 110a. In one or more embodiments, a storage pool corresponding to the extracted network identifier is determined at 310, preferably by the storage virtualizer 112. For example, the storage virtualizer 112 may determine that the extracted VNI related VXLAN 110a should be stored in storage pool 114a. In one or more other embodiments, the storage virtualizer 112 may determine a storage array corresponding to the extracted network identifier. For example, the storage virtualizer 112 may determine that the extracted VNI related VXLAN 110a should be stored in storage array 116a.

In response to identifying a storage location corresponding to the extracted network identifier, data from the packet is stored at 312, preferably by the storage virtualizer 112, within the assigned storage pool. For example, the storage virtualizer 112 may store data within the Ethernet packet in storage pool 114a. In one or more embodiments, the storage virtualizer 112 is configured to store data from packets having the same network identifier in a storage pool assigned to the network identifier. That is, one or more VMs on a first VXLAN can store data on a storage pool corresponding to the VNI, and, one or more other VMs on a second VXLAN can store data on a storage pool separate from the one related to the first VXLAN. Therefore, security, reliability, and multi-tenancy of the one or more VMs are ensured at the storage pool level given that the host hypervisor is not aware of a physical LBA address on drives due to storage virtualization.

For the cases in which the packet does not contain VXLAN header information (304:NO), data within the packet is stored at 306, preferably by the storage virtualizer 112, to one or more storage pools that do not correspond to a network identifier. In response to the storage virtualizer 112 determining that the packet does not contain VXLAN header information, the storage virtualizer 112 stores the data within the packet to one or more storage pools that do not correspond to a network identifier. For example, for the cases in which the packet does not contain VXLAN header information, the storage virtualizer 112 stores the data within the packet to storage pool 114c.

Figure 4:
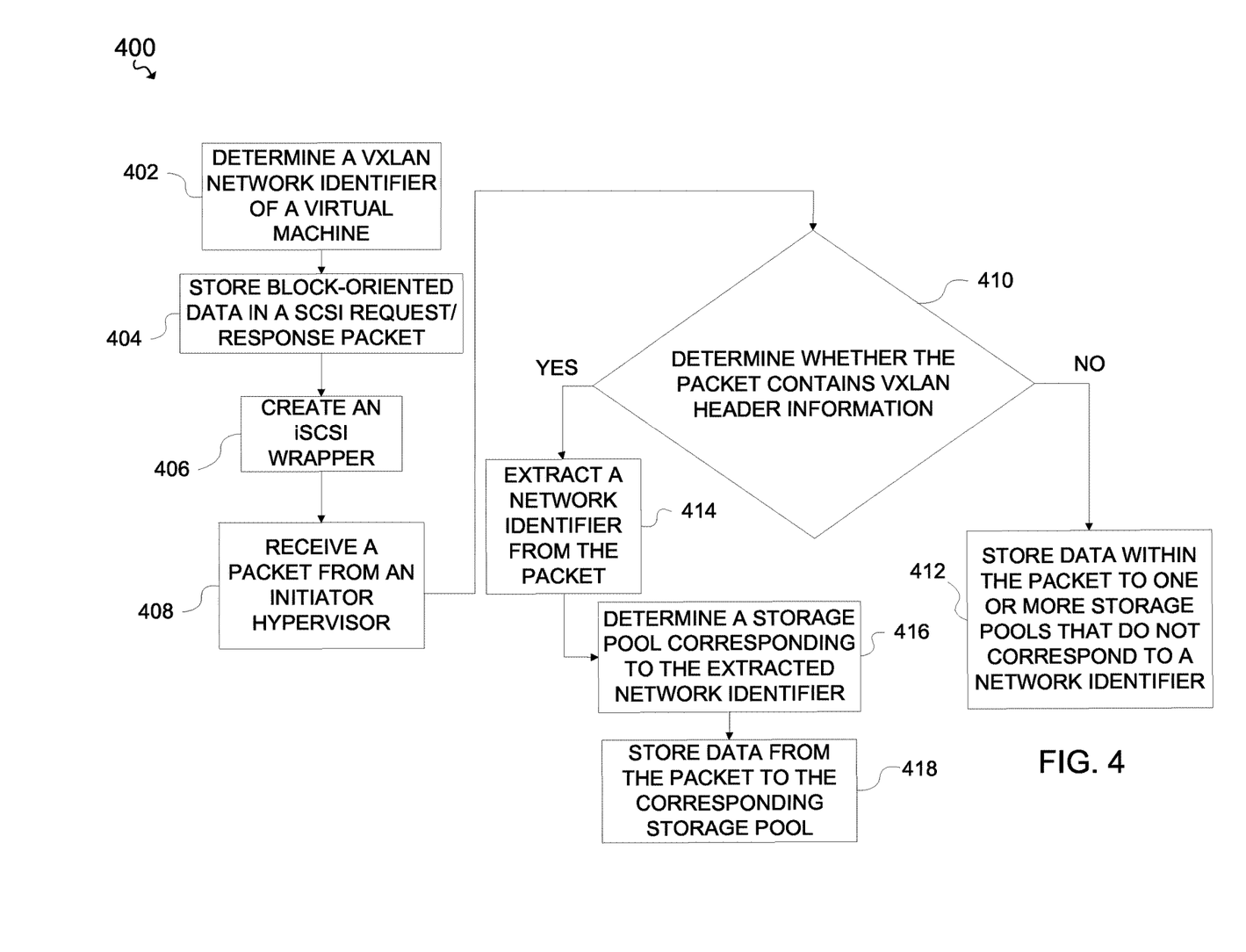
FIG. 4 is a flowchart illustrating a method of creating a storage identifier within a data packet and identifying a storage pool to store data, according to one or more embodiments of the present disclosure.

FIG. 4 is a flowchart illustrating a method 400 of creating a storage identifier within a data packet and identifying a storage pool to store data, according to one or more embodiments of the present disclosure. While the method 400 is described for the sake of convenience and not with an intent of limiting the disclosure as comprising a series and/or a number of steps, it is to be understood that the process does not need to be performed as a series of steps as shown in FIG. 4, but multiple steps can be abstracted into one functional unit that performs both the steps.

In one or more embodiments, a VXLAN network identifier ("VNI") for a VM is determined at 402. In one or more cases, a user who is provisioning the VM on the hypervisor, i.e., the host, may determine the corresponding VNI. For example, the user may determine a VNI for VM 108*a* as being VXLAN 110*b* and determines a VNI for VM 108*d* as being VXLAN 110*a*. In one or more embodiments, having determined the VNI, block-oriented data is stored in a small computer system interface (SCSI) request/response packet at 404, in which the block-oriented data is preferably stored either by the sender or the receiver of the SCSI based on whether the SCSI packet is a SCSI request packet or a SCSI response packet. It should be noted that block-oriented data and block data may be referred to interchangeably.

In one or more embodiments, an internet SCSI (iSCSI) wrapper is created at 406, preferably by the host client. The iSCSI wrapper may be created by encapsulating an SCSI packet in a TCP packet. In one or more cases, VXLAN information may be stored in the SCSI packet in a block command representation. iSCSI is a session layer protocol that assumes the presence of a reliable connection oriented transport layer protocol, such as, for example, TCP. The iSCSI wrapper may include one or more header segments and an optional data segment. The first segment may be a basic header segment (BHS), which is a fixed-length 48-byte header segment. The next segment in the iSCSI wrapper may be an Additional Header Segment (MIS). The MIS includes a 4 byte Type-Length-Value (TLV) information, followed by the MIS information, the length of which is specified by the Length field in the TLV information. In one or more embodiments, the host may create the iSCSI wrapper by encapsulating the SCSI Request/Response packet by adding the identified VNI in the AHS of the iSCSI wrapper. The host may add the identified VNI in the MIS at the VM level, in which the identified VNI may be later interpreted by the storage virtualizer 112.

In one or more embodiments, a packet is received at 408, preferably by the host target, from an initiator hypervisor. The host target may be, for example, an iSCSI server that is receiving the request. The initiator hypervisor, such as hypervisor 102*a*, 102*b*, and/or 102*c*, may send the packet to the host target. The packet may be an iSCSI packet and/or a network packet, such as a TCP packet. The iSCSI packet may or may not include an identified VNI in the MIS of the iSCSI packet. In one or more embodiments, a determination is made, preferably by the storage virtualizer 112, at 410 as to whether the packet contains VXLAN header information. For example, the host target may determine whether the iSCSI packet contains VXLAN header information by decapsulating the iSCSI packet reading the VNI from the VXLAN header information.

For the cases in which the packet does contain VXLAN header information (410:YES), a network identifier is extracted from the packet at 414, preferably by the host target. For example, the host target may extract a VNI from the MIS of the iSCSI packet, and determines that the extracted VNI corresponds to VXLAN 110*a*. In one or more embodiments, a storage pool corresponding to the extracted network identifier is determined at 416, preferably by the host target. For example, the host target may determine that the extracted VNI corresponding to VXLAN 110*a* should be stored in storage pool 114*a*. In one or more other embodiments, the host target may determine a storage array corresponding to the extracted network identifier. For example, the host target may determine that the extracted VNI related VXLAN 110*a* should be stored in storage array 116*a*.

In response to determining a storage pool corresponding to the extracted network identifier, data from the packet is stored at 418, preferably by the host target, within the corresponding storage pool. For example, the host target may store data within the iSCSI packet in storage pool 114*a*. In one or more embodiments, the host target may be configured to store data from packets having the same network identifier in a storage pool corresponding to the network identifier. That is, one or more VMs on a first VXLAN can store data on a storage pool corresponding to the VNI, and, one or more other VMs on a second VXLAN can store data on a storage pool separate from the one related to the first VXLAN. Therefore, security, reliability, and multi-tenancy of the one or more VMs are ensured at the storage pool level given that the host hypervisor is not aware of a physical LBA address on drives due to storage virtualization.

For the cases in which the packet does not contain VXLAN header information (410:NO), data within the packet is stored at 412, preferably by the host target, to one or more storage pools that do not correspond to a network identifier. For example, in response to the host target determining that the iSCSI packet does not contain VXLAN header information, the host target stores the data within the iSCSI packet to one or more storage pools that do not correspond to a VNI, such as storage pool 114*c*.

In one or more embodiments, the disclosure described herein provides one or more approaches for cloud storage to be aware of a VXLAN network domain in a virtualized data center. One or more approaches described herein allow a user to store their data on separate storage arrays and/or pools in a cloud environment. One or more approaches described herein improve storage selection for storing mission critical and/or sensitive data on secured and reliable storage arrays and less sensitive data on less secured and reliable storages arrays in a cloud storage data center. One or more approaches described herein improve data security and multi-tenancy at the data storage level without requiring independent storage resources for separate network domains, which would increase the complexity of administering networks. Additionally, one or more approaches provide end-to-end network separated data flow in a cloud storage data center where any change in routing of data packets by changing a network identifier using a man in the middle attack will be denied storing the data in storage and an administrator can be automatically notified for further actions. For example, for the cases in which a third party attempts to change the network identifier at the VM level, the storage virtualizer 112 would not recognize the changed network identifier and would prevent the data having the incorrect network identifier from being stored, thereby preventing a man in the middle attack.

While the illustrative embodiments described above are preferably implemented in hardware, such as in units and circuitry of a processor, various aspects of the illustrative embodiments may be implemented in software as well. For example, it will be understood that each block of the flowchart illustrations in FIGS. 3 and 4, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

In one or more embodiments, a method of isolating data to one or more storage pools includes receiving a packet from a host. In one or more embodiments, the method includes determining whether the packet contains virtual extensible local area network (VXLAN) information. In one or more embodiments, the method includes extracting, in response to determining that the packet contains VXLAN information, a network identifier from the packet. In one or more embodiments, the method includes determining one or more storage pools that correspond to the extracted network identifier. In one or more embodiments, the method includes storing data from the packet in the one or more determined storage pools.

In one or more embodiments, a computer program product includes a non-transitory computer-readable storage medium having program instructions embodied therewith for isolating data to one or more storage pools, in which the program instructions are executable by one or more processors. In one or more embodiments, the program instructions include receiving a packet from a host. In one or more embodiments, the program instructions includes determining whether the packet contains virtual extensible local area network (VXLAN) information. In one or more embodiments, the program instructions includes extracting, in response to determining that the packet contains VXLAN information, a network identifier from the packet. In one or more embodiments, the program instructions includes determining one or more storage pools that correspond to the extracted network identifier. In one or more embodiments, the program instructions includes storing data from the packet in the one or more determined storage pools.

In one or more embodiments, an apparatus for isolating data to one or more storage pools includes memory having program instructions embodied therewith, and at least one processor. In one or more embodiments, the at least one processor is configured to read the program instructions to execute a target configured to receive a packet from a host. In one or more embodiments, the at least one processor is configured to read the program instructions to execute a target configured to determine whether the packet contains virtual extensible local area network (VXLAN) information. In one or more embodiments, the at least one processor is configured to read the program instructions to execute a target configured to extract, in response to determining that the packet contains VXLAN information, a network identifier from the packet. In one or more embodiments, the at least one processor is configured to read the program instructions to execute a target configured to determine one or more storage pools that correspond to the extracted network identifier. In one or more embodiments, the at least one processor is configured to read the program instructions to execute a target configured to store data from the packet in the one or more determined storage pools.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of isolating data to one or more data storage pools in a data processing system having a single data storage virtualizer connected to one or more hosts via a network, wherein each host has a hypervisor that supports one or more virtual machines, and wherein the one or more virtual machines communicate over one or more virtual extensible local area networks (VXLANs) to create one or more isolated network environments, and the single data storage virtualizer is connected to one or more of the data storage pools to store the data, the method comprising:

receiving, by the single data storage virtualizer, a packet over the network from one or more of the hosts, the packet including the data and network identifier information;

determining whether the packet contains virtual extensible local area network (VXLAN) information;

extracting, in response to determining that the packet contains VXLAN information, a VXLAN network identifier from the packet;

determining a data storage pool from the one or more data storage pools that corresponds to the extracted VXLAN network identifier; and storing the data from the packet in the determined data storage pool that corresponds to the extracted VXLAN network identifier.

2. The method of claim 1 further comprising:

determining one or more data storage pools that do not correspond to any network VXLAN identifiers, and storing, in response to determining that the packet does not contain VXLAN information, the data from the packet in the one or more data storage pools that do not correspond to any VXLAN network identifiers.

3. The method of claim 1, wherein determining whether the packet contains VXLAN information comprises decapsulating the packet and reading the VXLAN header information within the packet.

4. The method of claim 1, wherein:

the packet is an Ethernet packet, and the VXLAN network identifier is included in a VXLAN header of the Ethernet packet.

5. The method of claim 1, wherein the host has an initiator hypervisor operating the one or more virtual machines.

6. The method of claim 1 further comprising:

determining the VXLAN network identifier for a virtual machine;

creating an internet small computer system interface (iSCSI) wrapper; and adding the determined VXLAN network identifier for the virtual machine in the iSCSI wrapper.

7. The method of claim 6, wherein the determined VXLAN network identifier for the virtual machine is added to an additional header segment of the iSCSI wrapper.

8. A computer program product comprising:

a computer-readable storage medium having program instructions embodied therewith for isolating data to one or more data storage pools in a data processing system having a single data storage virtualizer connected to one or more hosts via a network, wherein each host has a hypervisor that supports one or more virtual machines, and wherein the one or more virtual machines communicate over one or more virtual extensible local area networks (VXLANs) to create one or more isolated network environments, and the single data storage virtualizer is connected to one or more of the data storage pools to store the data, the program instructions executable by one or more processors, the program instructions comprising:

receiving, by the single data storage virtualizer, a packet over the network from one or more hosts, the packet including the data and network identifier information;

determining whether the packet contains virtual extensible local area network (VXLAN) information;

extracting, in response to determining that the packet contains VXLAN information, a VXLAN network identifier from the packet;

determining a data storage pool from the one or more data storage pools that corresponds to the extracted VXLAN network identifier; and storing the data from the packet in the determined data storage pool that corresponds to the extracted VXLAN network identifier.

9. The computer program product of claim 8, wherein the program instructions further comprise:

determining one or more data storage pools that do not correspond to any VXLAN network identifiers, and storing, in response to determining that the packet does not contain VXLAN information, the data from the packet in the one or more data storage pools that do not correspond to any VXLAN network identifiers.

10. The computer program product of claim 8, wherein determining whether the packet contains VXLAN information comprises decapsulating the packet and reading the VXLAN header information within the packet.

11. The computer program product of claim 8, wherein:

the packet is an Ethernet packet, and the VXLAN network identifier is included in a VXLAN header of the Ethernet packet.

12. The computer program product of claim 8, wherein the host has an initiator hypervisor operating the one or more virtual machines.

13. The computer program product of claim 8, wherein the program instructions further comprise:

determining the VXLAN network identifier for a virtual machine;

creating an internet small computer system interface (iSCSI) wrapper; and adding the determined network identifier for the virtual machine in the iSCSI wrapper.

14. The computer program product of claim 13, wherein the determined VXLAN network identifier for the virtual machine is added to an additional header segment of the iSCSI wrapper.

15. An apparatus for isolating data to one or more data storage pools, the apparatus comprising:

a data processing system having a single data storage virtualizer connected to one or more hosts via a network, wherein each host has a hypervisor that supports one or more virtual machines that communicate over one or more virtual extensible local area networks (VXLANs) to create one or more isolated network environments, and the single data storage virtualizer is connected to one or more of the data storage pools to store the data;

memory having program instructions embodied therewith, and at least one processor configured to read and execute the program instructions so that:

a target is configured to:

receive, by the single data storage virtualizer, a packet over the network from one or more hosts, the packet including the data and network identifier information;

determine whether the packet contains virtual extensible local area network (VXLAN) information;

extract, in response to determining that the packet contains VXLAN information, a VXLAN network identifier from the packet;

determine a data storage pool from the one or more data storage pools that corresponds to the extracted VXLAN network identifier; and store the data from the packet in the determined data storage pool that corresponds to the extracted VXLAN network identifier.

16. The apparatus of claim 15, wherein the target is further configured to:

determine one or more data storage pools that do not correspond to any network VXLAN identifiers, and store, in response to determining that the packet does not contain VXLAN information, the data from the packet in the one or more data storage pools that do not correspond to any VXLAN network identifiers.

17. The apparatus of claim 15, wherein the target is configured to determine whether the packet contains VXLAN information by decapsulating the packet and reading the VXLAN header information within the packet.

18. The apparatus of claim 15, wherein:

the packet is an Ethernet packet, and the VXLAN network identifier is included in a VXLAN header of the Ethernet packet.

19. The apparatus of claim 15, wherein the host has an initiator hypervisor operating the one or more virtual machines.

20. The apparatus of claim 15, wherein the at least one processor is further configured to read and execute the program instructions so that:

a host is configured to:

create an internet small computer system interface (iSCSI) wrapper; and add the VXLAN network identifier for a virtual machine in the iSCSI wrapper.

* * * * *